(12) United States Patent  
Creusot (10) Patent No.: US 11,900,609 B2  
(45) Date of Patent: *Feb. 13, 2024

(54) TRAFFIC LIGHT OCCLUSION DETECTION FOR AUTONOMOUS VEHICLE

(71) Applicant: GM GLOBAL TECHNOLOGY OPERATIONS LLC, Detroit, MI (US)

(72) Inventor: Clement Creusot, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,453

(22) Filed: Feb. 3, 2023

(65) Prior Publication Data

US 2023/0186479 A1   Jun. 15, 2023

Related U.S. Application Data

(63) Continuation of application No. 17/139,270, filed on Dec. 31, 2020, now Pat. No. 11,592,831, which is a (Continued)

(51) Int. Cl.
*G06T 7/11* (2017.01)
*G05D 1/02* (2020.01)
(Continued)

(52) U.S. Cl.
CPC .............. *G06T 7/11* (2017.01); *G05D 1/0088* (2013.01); *G05D 1/0231* (2013.01); *G06T 7/194* (2017.01);
(Continued)

(58) Field of Classification Search
CPC ......... G06T 7/11; G06T 7/194; G05D 1/0088; G05D 1/0231; G06V 10/25; G06V 10/764; G06V 10/82; G06V 20/584
See application file for complete search history.

(56) References Cited

U.S. PATENT DOCUMENTS 8,660,734 B2   2/2014   Zhu et al.
9,315,192 B1 *  4/2016   Zhu .................. B60W 30/09
(Continued)

OTHER PUBLICATIONS

Biasutti, et al., "Disocclusion of 3D LiDAR Point Clouds Using Range Images", In ISPRS International Society for Photogrammetry and Remote Sensing (CMRT), May 14, 2017, pp. 1-8.
(Continued)

*Primary Examiner* — Rami Khatib
*Assistant Examiner* — Gabriel Joseph Rene Lambert
(74) *Attorney, Agent, or Firm* — CALFEE, HALTER & GRISWOLD LLP (57) ABSTRACT

An occlusion detection system for an autonomous vehicle is described herein, where a signal conversion system receives a three-dimensional sensor signal from a sensor system and projects the three-dimensional sensor signal into a two-dimensional range image having a plurality of pixel values that include distance information to objects captured in the range image. A localization system detects a first object in the range image, such as a traffic light, having first distance information and a second object in the range image, such as a foreground object, having second distance information. An occlusion polygon is defined around the second object and the range image is provided to an object perception system that excludes information within the occlusion polygon to determine a configuration of the first object. A directive is output by the object perception system to control the autonomous vehicle based upon occlusion detection.

20 Claims, 7 Drawing Sheets

Related U.S. Application Data continuation of application No. 16/124,243, filed on Sep. 7, 2018, now Pat. No. 10,884,424.

(51) Int. Cl.
   *G05D 1/00* (2006.01)
   *G06T 7/194* (2017.01)
   *G06V 10/25* (2022.01)
   *G06V 20/58* (2022.01)
   *G06V 10/764* (2022.01)
   *G06V 10/82* (2022.01)

(52) U.S. Cl.
   CPC ............ *G06V 10/25* (2022.01); *G06V 10/764* (2022.01); *G06V 10/82* (2022.01); *G06V 20/584* (2022.01); *G05D 2201/0213* (2013.01); *G06T 2207/10028* (2013.01); *G06T 2207/30252* (2013.01)

(56) References Cited

U.S. PATENT DOCUMENTS

| | | | |
|---|---|---|---|
| 9,390,328 | B2 | 7/2016 | Shreve et al. |
| 9,760,092 | B2 | 9/2017 | Ferguson et al. |
| 9,892,332 | B1 | 2/2018 | Wendel et al. |
| 9,915,951 | B2 | 3/2018 | Mei et al. |
| 9,922,259 | B2 | 3/2018 | Matsuo et al. |
| 9,990,548 | B2 | 6/2018 | Wellington et al. |
| 10,008,113 | B2 | 6/2018 | Ova et al. |
| 10,032,085 | B2 | 7/2018 | Raghu et al. |
| 10,507,807 | B2 | 12/2019 | Ben Shalom |
| 10,884,424 | B2 | 1/2021 | Creusot |
| 2012/0229681 | A1 | 9/2012 | Ansfield et al. |
| 2014/0119654 | A1 | 5/2014 | Taylor et al. |
| 2014/0347475 | A1 | 11/2014 | Divakaran et al. |
| 2015/0310273 | A1 | 10/2015 | Shreve et al. |
| 2016/0318490 | A1* | 11/2016 | Ben Shalom ... B60W 30/18154 |
| 2017/0220874 | A1 | 8/2017 | Ayvaci et al. |
| 2018/0012088 | A1 | 1/2018 | Matsuo et al. |
| 2018/0095475 | A1 | 4/2018 | Minster et al. |
| 2018/0307922 | A1 | 10/2018 | Yoon et al. |
| 2018/0307925 | A1 | 10/2018 | Wisniowski et al. |
| 2018/0348346 | A1 | 12/2018 | Vallespi-Gonzalez et al. |
| 2019/0232762 | A1 | 8/2019 | Wilson |
| 2019/0236381 | A1* | 8/2019 | Rochan Meganathan ................... G06T 7/70 |
| 2019/0329768 | A1 | 10/2019 | Shalev-Shwartz et al. |
| 2019/0340775 | A1 | 11/2019 | Lee et al. |
| 2019/0347525 | A1 | 11/2019 | Liem et al. |
| 2019/0353774 | A1 | 11/2019 | Chondro et al. |
| 2020/0081448 | A1 | 3/2020 | Creusot |
| 2020/0081450 | A1 | 3/2020 | Creusot |
| 2020/0134333 | A1 | 4/2020 | Vishal et al. |

OTHER PUBLICATIONS

"Non-Final Office Action for U.S. Appl. No. 16/124,243", dated Apr. 24, 2020, 27 Pages. (CRSP-0033).

"Reply to Non-Final Office Action for U.S. Appl. No. 16/124,243", Filed Date: Jul. 24, 2020, 14 Pages. (CRSP-0033).

"Notice of Allowance and Fees Due for U.S. Appl. No. 16/124,243", dated Oct. 14, 2020, 5 Pages. (CRSP-0033).

"Office Action for U.S. Appl. No. 17/139,270", dated Sep. 14, 2022, 16 pages.

"Response to the Office Action for U.S. Appl. No. 17/139,270", Filed Date: Oct. 10, 2022, 9 pages.

"Notice of Allowance and Fees Due for United States U.S. Appl. No. 17/139,270", dated Nov. 1, 2022, 10 pages.

* cited by examiner

TRAFFIC LIGHT OCCLUSION DETECTION FOR AUTONOMOUS VEHICLE

CROSS-REFERENCE TO RELATED APPLICATION

This application is a continuation of U.S. patent application Ser. No. 17/139,270, filed on Dec. 31, 2020, and entitled "TRAFFIC LIGHT OCCLUSION DETECTION FOR AUTONOMOUS VEHICLE", which is a continuation of U.S. Pat. No. 10,884,424, filed on Sep. 7, 2018, and entitled "TRAFFIC LIGHT OCCLUSION DETECTION FOR AUTONOMOUS VEHICLE", the entireties of which are incorporated herein by reference.

BACKGROUND

An autonomous vehicle is a motorized vehicle that can operate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Typically, sensor signals are provided to a computing system in communication with the plurality of sensor systems, wherein the sensor signals capture objects in proximity to the autonomous vehicle, such as traffic lights and occluding objects. The sensor signals are processed by the computing system and, based upon detection of a traffic light or other object captured in the sensor signal, the processor executes instructions to control a mechanical system of the autonomous vehicle, such as a vehicle propulsion system, a braking system, or a steering system.

Unlike detection of physical objects, detecting the illuminated configuration of a traffic light is particularly suited for camera sensor systems that generate two-dimensional image sensor signals which capture emitted light from the traffic light. The camera sensor system may sample a field of view at approximately 10 hertz so that when a configuration of the traffic light changes, such as from a red light to a green light, the mechanical systems of the autonomous vehicle can be manipulated in accordance therewith. The autonomous vehicle is then controlled based upon a directive generated according to the detected configuration of the traffic light. For example, a solid red light corresponds to a directive of STOP, whereas as a flashing red light corresponds to a directive of STOP_AND_YIELD.

Problematically for camera sensor systems is that when an occluding object passes between the traffic light and a lens of the camera, the computing system may inaccurately detect the configuration of the traffic light. For example, if an autonomous vehicle is disposed in front of a solid red light requiring the vehicle to remain stopped, but a tall truck or passing train crosses in front of the autonomous vehicle and temporarily occludes the traffic light from the viewing range of the camera sensor system, the computing system may detect a flashing red light instead of the solid red light. Thus, the control system may erroneously instruct the autonomous vehicle to advance through the intersection, as it otherwise would if the traffic light were a flashing red light.

While detection of depth/distance may be used to distinguish between a traffic light body and an occluding object disposed in front of the traffic light body, such techniques are complicated by the need for camera sensor systems that define two-dimensional images which capture emitted light from the traffic light. In addition, while a three-dimensional sensor system, such as a lidar, may supplement a camera sensor system by generating a point cloud that defines various distances to objects, such as the traffic light body and an occluding object, the processing time of three-dimensional sensor signals is much slower than the processing time of two-dimensional sensor signals, thereby causing a lag in processing times between the sensor signals of the two types of sensor systems.

SUMMARY

The following is a brief summary of subject matter that is described in greater detail herein. This summary is not intended to be limiting as to the scope of the claims.

Described herein are various technologies pertaining to traffic light occlusion detection for an autonomous vehicle. With more specificity, described herein are various technologies pertaining to improving the reliability of traffic light detection by generating a sensor signal that incorporates distance information to detect an occlusion while maintaining a processing time comparable to conventional two-dimensional sensor signals. With still more specificity, described herein is a traffic light detection system that converts a three-dimensional point cloud into a two-dimensional range image having a plurality of pixel values which include distance information to objects captured in the range image. A configuration of a first object (e.g., traffic light) in the range image is determined by defining an occlusion polygon around a second object (e.g., a foreground/occluding object) in the range image and excluding the region of the range image captured by the occlusion polygon from the configuration determination of the first object, wherein the configuration determination of the first object is based upon a remaining portion of the range image outside the occlusion polygon. A mechanical system such as a vehicle propulsion system, a braking system, or a steering system is controlled based upon the configuration determination of the first object from the remaining portion of the range image.

An exemplary autonomous vehicle can incorporate various systems to provide traffic light occlusion detection. Alternatively, the autonomous vehicle can incorporate a single system that performs all of the required functions for traffic light occlusion detections. A signal conversion system can first receive a three-dimensional sensor signal generated by a sensor system. The sensor system may be a lidar camera and the sensor signal may be a point cloud that captures a field of view of an environment in which an autonomous vehicle is located; for instance, one or more objects may be in the field of view. The signal conversion system projects the three-dimensional sensor signal (point cloud) into a two-dimensional range image/pixel patch, wherein each pixel in the range image includes a pixel value that incorporates distance information to objects disposed at a corresponding point in the range image. Distances from the sensor system that are too remote for detection (e.g., outside the detection range of the particular lidar/sensor system attached to the autonomous vehicle) are given a pixel value of undefined. Thus, each pixel value in the range image is either defined or undefined and, if defined, the distance information identifies a distance from the sensor system to an object captured at that pixel.

A localization system can further receive the range image output by the signal conversion system. The localization system is configured to calibrate and localize objects captured in the generated range image based upon a geometric projection between the sensor system and a detected object, such as a traffic light. The localization system may define a region of interest that approximately centralizes a detected traffic light therein and is typically dimensioned to be larger than the dimensions of a traffic light to provide a tolerance for map calibration and localization errors. For example, the region of interest may be sized such that a 1-meter spatial buffer would be provided around the perimeter of a centralized traffic light. The range image/pixel patch is then cropped by the localization system to define the region of interest according to desirable dimensions.

The region of interest includes the traffic light as well as distance information corresponding thereto. Distance information of pixel values for the entire region of interest is separated into three groups: 1) distances to objects that are roughly the same as the distance information corresponding to the traffic light (e.g., the body of the traffic light, the pole or wire supporting the traffic light, etc.); 2) distances to objects that are closer than the distance information corresponding to the traffic light; and 3) distances to objects that are farther than the distance information corresponding to the traffic light. Closer distance information may correspond to occluding foreground objects, whereas farther distance information corresponds to background points. While an occlusion polygon is defined around foreground objects in the region of interest to identify occlusions to traffic lights, the traffic light detection architecture is configured to identify and remove detected background lights by defining a similar polygon around such objects within the region of interest. The occlusion polygon and/or related background polygon is typically configured as a convex polygon.

An object perception system can additionally receive the region of interest capturing the traffic light, which may include the occlusion polygon defined around a foreground object. The object perception system likewise comprises an occlusion reasoning module configured to track, store, and predict the position of a traffic light based upon positive traffic light detections. Thus, when the foreground object/occlusion polygon occupies the same spatial position in the region of interest as the traffic light, the occlusion reasoning module can determine that the traffic light is occluded. Full occlusion occurs when the foreground object completely covers the detected location of the traffic light, whereas partial occlusion occurs when the foreground object blocks only a portion of the detected traffic light. The occlusion reasoning module may also detect and exclude emitted bursts of light from traffic light configuration determinations. For example, an object detector may detect an extraneous burst of yellow light, but the occlusion reasoning module may confirm that the light is still green and exclude the detected burst of yellow light.

Accordingly, the occlusion reasoning module can determine the configuration of the traffic light by sampling range images at a particular sampling rate and excluding samples where the traffic light was occluded or otherwise obscured to generate a directive based upon only non-occluded/non-obscured samples. In some instances, the occlusion reasoning module may also determine the configuration of a detected traffic light from partially occluded range image samples. For example, if the position of a green light is occluded but a red light is detected and not occluded, the occlusion reasoning module may include the sample in a traffic light configuration determination regarding red light directives. Alternatively, if the red light is no longer illuminated, the occlusion reasoning module could make a configuration determination regarding an occluded bulb that is illuminated (e.g., reasoning that an occluded green light is illuminated when non-occluded red and yellow lights are not illuminated).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to traffic light occlusion detection for an autonomous vehicle is now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices.

Further, as used herein, the term "exemplary" is intended to mean serving as an illustration or example of something and is not intended to indicate a preference.

As used herein, the term "occlusion" refers to an object that is spatially positioned such that it partially or completely obstructs sensor system detection of emitted light from a traffic light. As further used herein an "occlusion polygon" defines an imaginary perimeter around an occluding object.

Figure 1:
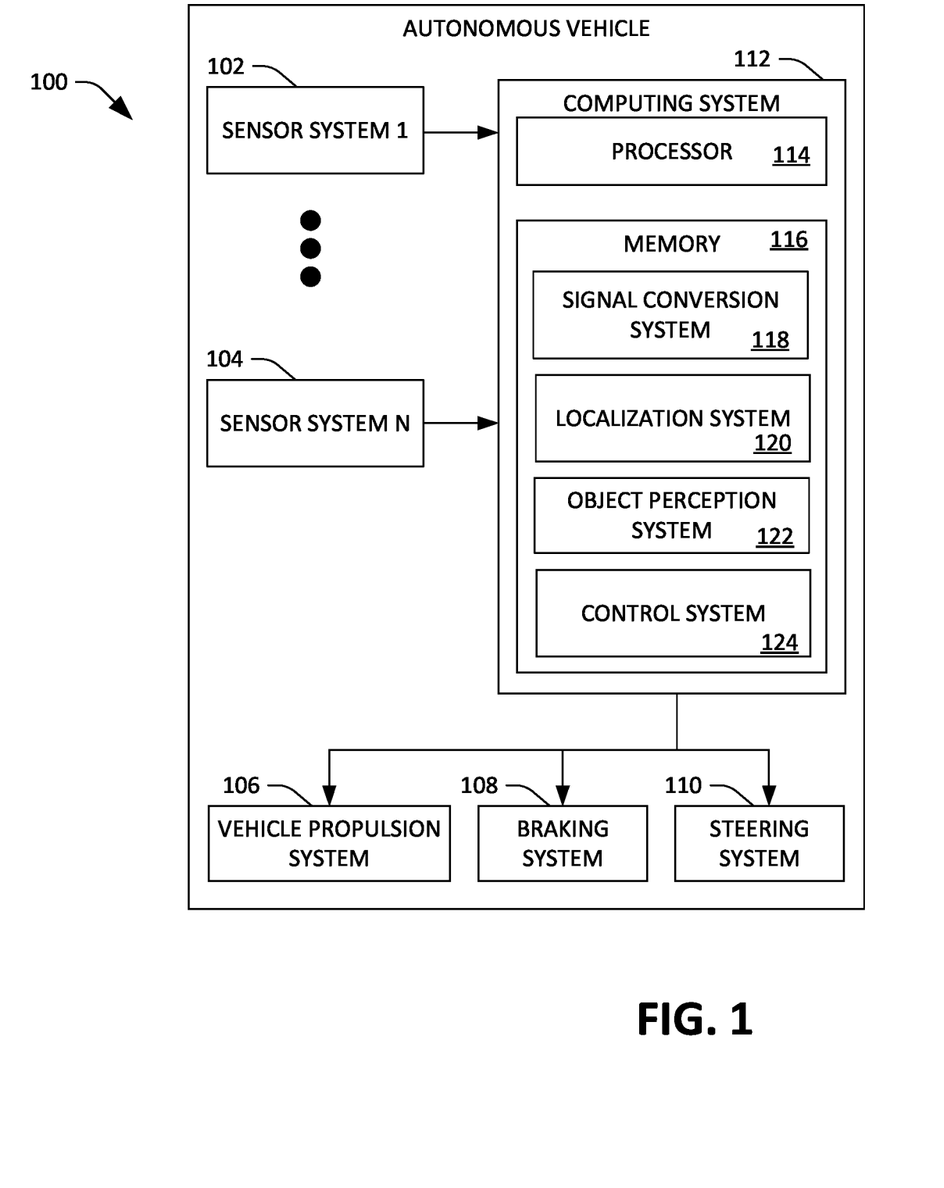
FIG. 1 illustrates an exemplary autonomous vehicle.

With reference now to FIG. 1, an exemplary autonomous vehicle 100 is illustrated. The autonomous vehicle 100 can navigate about roadways without a human driver based upon sensor signals output by sensor systems 102-104 of the autonomous vehicle 100. The autonomous vehicle 100 includes a plurality of sensor systems 102-104 (a first sensor system 102 through an Nth sensor system 104). The sensor systems 102-104 are of different types and are arranged about the autonomous vehicle 100. For example, the first sensor system 102 may be a camera sensor system and the Nth sensor system 104 may be a lidar system; or the sensor systems 102-104 may be of different types of a same kind of sensor system, such as different types of camera sensor systems (e.g., fixed exposure and autoexposure). Other exemplary sensor systems include radar sensor systems, global positioning system (GPS) sensor systems, infrared sensor systems, sonar sensor systems, and the like.

While certain sensor systems have limited individual viewing ranges (e.g., a camera sensor system may have a viewing range of 66 degrees), the incorporation of additional sensor systems 102-104 to the autonomous vehicle 100 can increase the viewing range of the sensor systems 102-104 up to 180 degrees and beyond, if desirable. Furthermore, some or all of the plurality of sensor systems 102-104 may comprise articulating sensors. An articulating sensor is a sensor that may be oriented (i.e., rotated) by the autonomous vehicle 100 such that a field of view of the articulating sensor may be directed towards different regions surrounding the autonomous vehicle 100.

The autonomous vehicle 100 further includes several mechanical systems that are used to effectuate appropriate motion of the autonomous vehicle 100. For instance, the mechanical systems can include but are not limited to, a vehicle propulsion system 106, a braking system 108, and a steering system 110. The vehicle propulsion system 106 may include an electric motor, an internal combustion engine, or both. The braking system 108 can include an engine break, brake pads, actuators, and/or any other suitable componentry that is configured to assist in decelerating the autonomous vehicle 100. The steering system 110 includes suitable componentry that is configured to control the direction of movement of the autonomous vehicle 100 during propulsion.

The autonomous vehicle 100 additionally comprises a computing system 112 that is in communication with the sensor systems 102-104 and is further in communication with the vehicle propulsion system 106, the braking system 108, and the steering system 110. The computing system 112 includes a processor 114 and memory 116 that includes computer-executable instructions that are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 116 comprises three systems which may cooperate to provide traffic light occlusion detection (e.g., a signal conversion system 118, a localization system 120, and an object perception system 122). The signal conversion system 118 is configured to receive a sensor signal, such as a point cloud, that represents a three-dimensional environment from a sensor system and project the three-dimensional point cloud into a two-dimensional range image having distance information that differentiates foreground objects from focal objects such as traffic lights. The localization system 120 detects objects captured in the range image based upon the distance information and defines an occlusion polygon around foreground objects, which are excluded from a configuration determination of the focal object (traffic light). The object perception system 122 receives the range image from the localization system 120 and generates a directive for controlling the autonomous vehicle 100 based upon a configuration determination of the focal object. The configuration determination may or may not be based upon exclusion of the occlusion polygon from the range image.

The memory 116 further includes a control system 124 configured to receive the directive output by the object perception system 122 and control at least one mechanical system (e.g., the vehicle propulsion system 106, the brake system 108, and/or the steering system 110) of the autonomous vehicle 100 in accordance therewith. The generated directive defines the most suitable course of action that an autonomous vehicle 100 should perform according to the detected configuration of the traffic light and/or lane as well as the applicable laws of the region.

Figure 2:
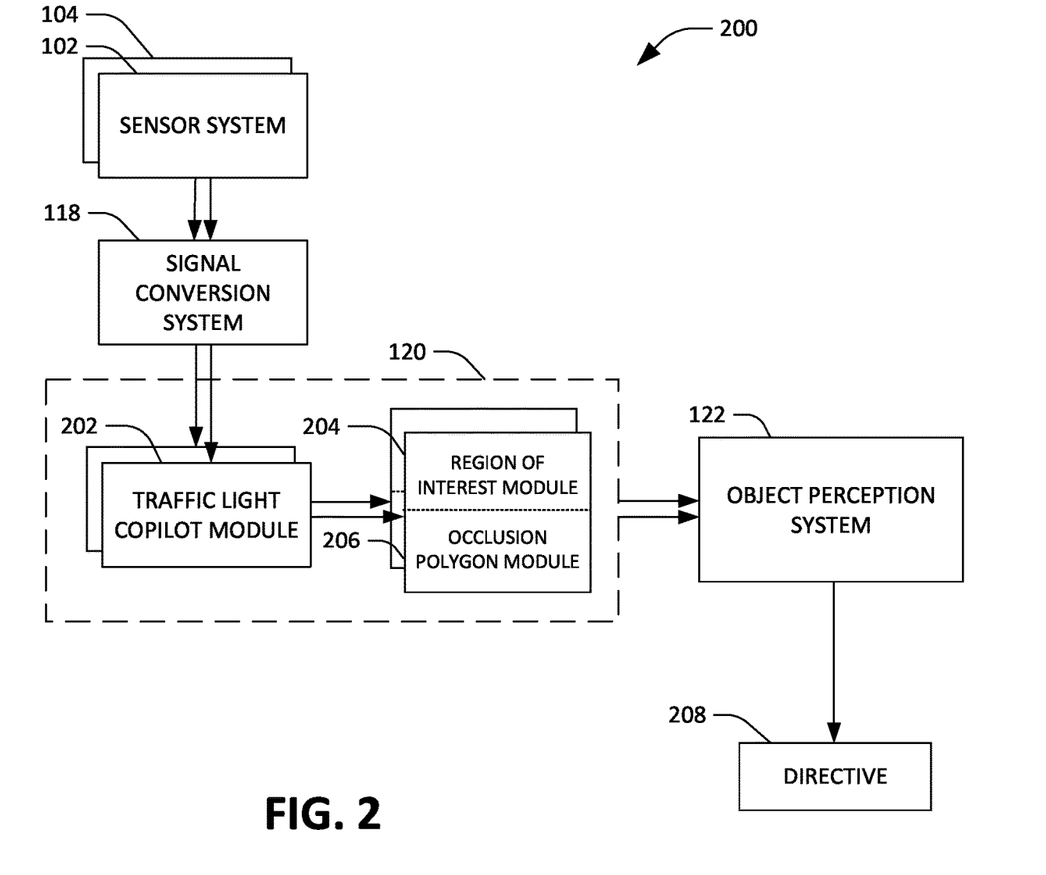
FIG. 2 illustrates an exemplary architecture configured to output a directive for an autonomous vehicle based upon detection of a traffic light occlusion.

With reference now to FIG. 2, an architecture 200 is implemented by the computing system 112 to output a directive for an autonomous vehicle based upon detection of a traffic light occlusion captured in a sensor signal generated by the sensor systems 102-104. The sensor systems 102-104 may include a plurality of lidar cameras that provide a first sensor signal and a second sensor signal (e.g., a first point cloud and a second point cloud) to the signal conversion system 118. Additionally, the sensor signals may be generated by sensor systems 102-104 of different types where, for example, the first sensor signal can be a point cloud and the second sensor signal is a camera image corresponding to a same field of view captured by the first sensor signal. The information captured in the sensor signals is provided to the signal conversion system 118 and further to the localization and object perception systems 120-122. Thus, the architecture 200 illustrates a multimodal system configured to generate a directive 208 based upon a plurality of sensor signal inputs.

The signal conversion system 118 is configured to receive a three-dimensional sensor signal from the sensor systems 102-104 and convert the three-dimensional sensor signal into a two-dimensional range image/sparse depth map. The range image comprises a plurality of pixel values that define distance information to one or more objects captured in a field of view of the range image. In particular, the distance information of each pixel defines a distance at each point in the range image. Features in the field of view that are disposed far away from the sensor systems 102-104, such as a distant object or the sky, have a corresponding pixel value of undefined and are not identified in the range image by finite distance values but do correspond to distance information, albeit undefined values. The signal conversion system 118 may also receive a two-dimensional camera image that is approximately the same size as a three-dimensional lidar point cloud to improve conversion of the point cloud into a range image. Since the processing time of three-dimensional sensor signals can be slower than the processing time of two-dimensional sensor signals, conversion of the point cloud into a range image by the conversion system 118 resolves conventional processing drawbacks associated with using three-dimensional sensor systems to detect occlusions.

The localization system 120 receives the range image output by the signal conversion system 118 and includes a traffic light copilot module 202, a region of interest module 204, and an occlusion polygon module 206. In an exemplary embodiment, the region of interest module 204 and the occlusion polygon module 206 may be incorporated within the traffic light copilot module 202. The region of interest module 204 and the occlusion polygon module 206 may also be included together as features of a single calibration module. The traffic light copilot module 202 defines a geometric projection that identifies where an object, such as a traffic light, is positioned relative to the sensor systems 102-104 of the autonomous vehicle 100. The output of the traffic light copilot module 202 is provided to the occlusion polygon module 206 and/or the region of interest module 204. The region of interest module 204 defines a region of interest that frames a focal object, such as a traffic light, captured in the range image. The region of interest comprises dimensions that are larger than the focal object to provide a tolerance for map calibration and localization errors (e.g., the region of interest may correspond to a height of 3 meters when defined around a traffic light having a height of 1 meter).

The occlusion polygon module 206 identifies foreground objects/occlusions by defining an occlusion polygon around the foreground objects based upon the distance information incorporated in the range image. If a region of interest is defined by the region of interest module 204, the occlusion polygon module 206 generally defines the occlusion polygon around a foreground object within the region of interest of the focal object. Otherwise, the occlusion polygon is defined around a foreground object in the range image that is in proximity to the focal object. While the occlusion polygon is typically formed as a convex polygon, it is not limited to any specific configuration. When a region of interest is defined around a focal object, the range image is cropped to the dimensions of the region of interest and provided to an object perception system 122, along with any occlusion polygon or remaining portions thereof defined around a foreground object within the region of interest. The architecture 200 outputs a directive 208 from the object perception system 122 to control the autonomous vehicle 100 based upon detection of an occluded focal object.

Figure 3:
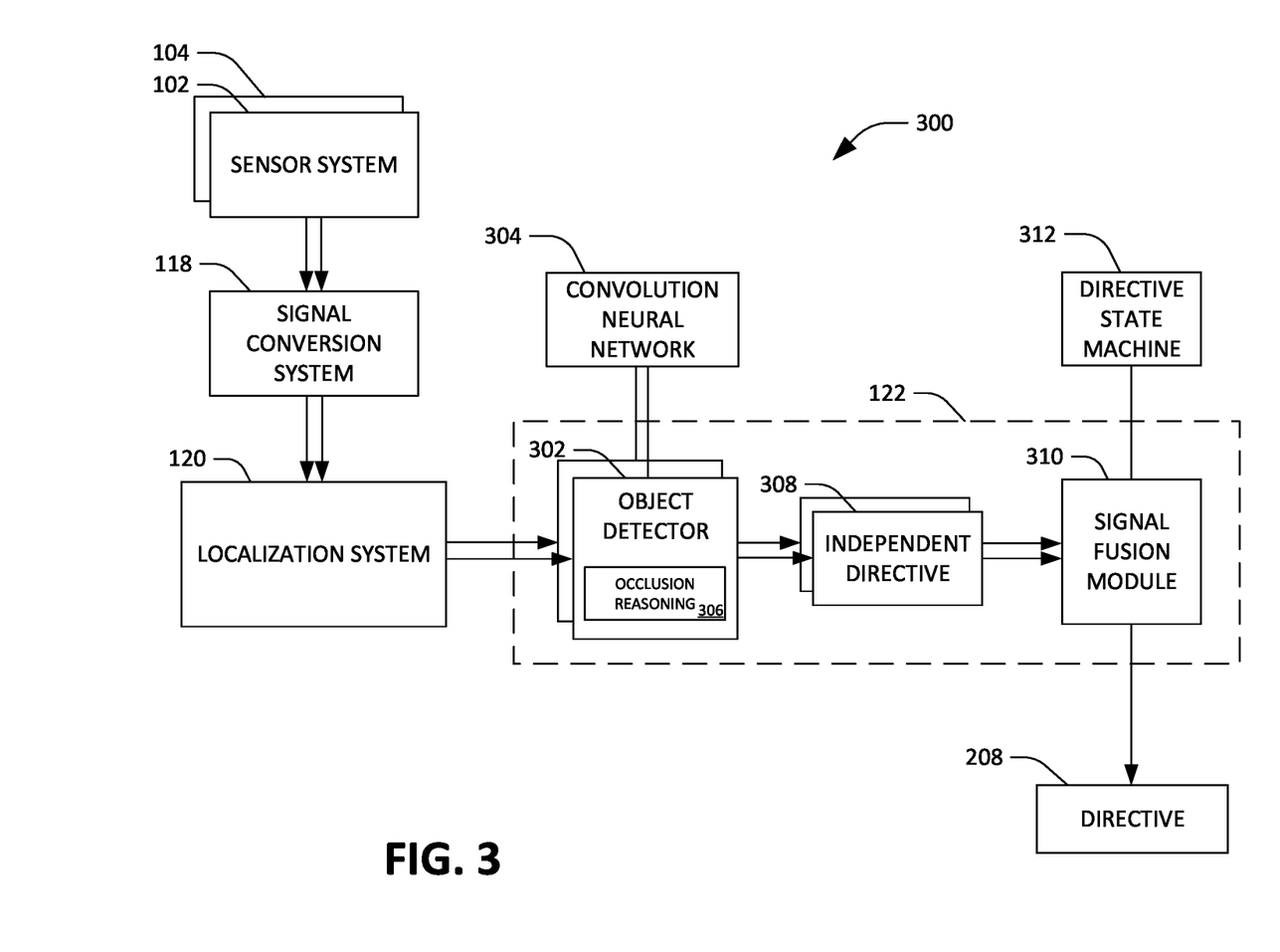
FIG. 3 illustrates an exemplary architecture configured to output a directive for an autonomous vehicle based upon detection of a traffic light occlusion.

With reference now to FIG. 3, architecture 300 is implemented by the computing system 112 to output a directive 208. The object perception system 122 of architecture 300 includes an object detector 302 having an occlusion reasoning module 306. The object detector 302 detects the configuration of a traffic light captured in an input range image to generate the directive 208 based upon illuminated bulbs thereof. The object detectors 302 can be, but are not limited to, one of an absolute detector which detects a kind of bulb that is illuminated (e.g., a solid red circle) or a relative activation detector which determines the configuration of a traffic light based upon inferences about the layout of the traffic light. For example, if the top position of a vertically aligned three-bulb traffic light is illuminated, the relative activation detector may infer a "solid red circle" based upon a taxonomy of predefined layouts incorporated in the memory 116 to generate the directive 208.

The occlusion reasoning module 306 confirms or rejects the detected configuration of the traffic light by the object detector 302 based upon whether the range image includes an occlusion that is fully or partially blocking the traffic light from sensor signals emitted by the sensor systems 102-104. If the configuration of the traffic light cannot be confirmed in a particular range image, such as when an emitted burst of light obscures object detection, the range image may be excluded by the occlusion reasoning module 306 from traffic light configuration determinations.

The occlusion reasoning module 306 may further sample a plurality of range images to track, store, and predict the configuration of a traffic light detected by the localization system 120. In range image samples that include an occlusion to the traffic light, the occlusion reasoning module 306 may exclude such samples from a configuration determination or it may define an expected configuration based upon information detected from one or more previous samples. For example, a previous range image may capture the vertically aligned three-bulb traffic light having an illuminated solid red circle but in a current range image the traffic light is fully occluded. The occlusion reasoning module 306 can determine based upon the layout of the traffic light that such lights do not generally change from solid red to flashing red during brief periods of occlusion. Additionally, the occlusion reasoning module 306 may determine that an occluded traffic light is expected to change from a solid red circle to a solid green circle after a certain length of time. Thus, if only the bottom (green bulb) of the traffic light is occluded but the red light and yellow light is exposed to the sensor systems 102-104, the occlusion reasoning module 306 can determine that a solid green circle is illumined when the solid red/yellow circles are no longer in a light emitting configuration.

When a plurality of range images is provided to the localization system 120 and further to the object perception system 122, the object detectors 302 generate a plurality of independent directives 308 that corresponds to the plurality of range images. Each independent directive 308 defines a (pre-fusion) vehicle maneuver according to a configuration of the traffic light detected by individual object detectors 308 that is based upon occlusion reasoning with respect to a specific range image input from the localization system 120. The plurality of independent directives 308 are subsequently provided to a signal fusion module 310 where they are fused together to output a fused directive 208 for controlling the autonomous vehicle 100. If only one range image is provided to the object perception system 122, or if a plurality of object detector inputs is fused into a single directive at the object detector level, fusion is not required by the signal fusion module 310 and the independent directive 308 is itself output as the fused directive 208. The directive 208 is then provided to the control system 124 for controlling the autonomous vehicle 100.

Further included in the architecture 300 is a convolution neural network 304 and a directive state machine 312. The convolution neural network 304 is linked to the object detector 302 to identify object configurations in the region of interest/range image that are output by the localization system 120. In an exemplary embodiment, a plurality of convolution neural networks 304 can be executed on a same input (range image) to the object perception system 122 to detect a plurality of object configurations captured in the range image. The directive state machine 312 is in communication with the object perception system 122. The directive state machine 312 is configured to define at least eight universal directives including: STOP (red light), STOP_AND_YIELD (flashing red light), MAYBE_STOP (yellow light), YIELD (flashing yellow light), ABOUT_TO_GO (light will soon turn green—transition directive in some countries), GO (green light), GO_PROTECTED (proceed through), and UNKNOWN (no detected light).

Figure 4:
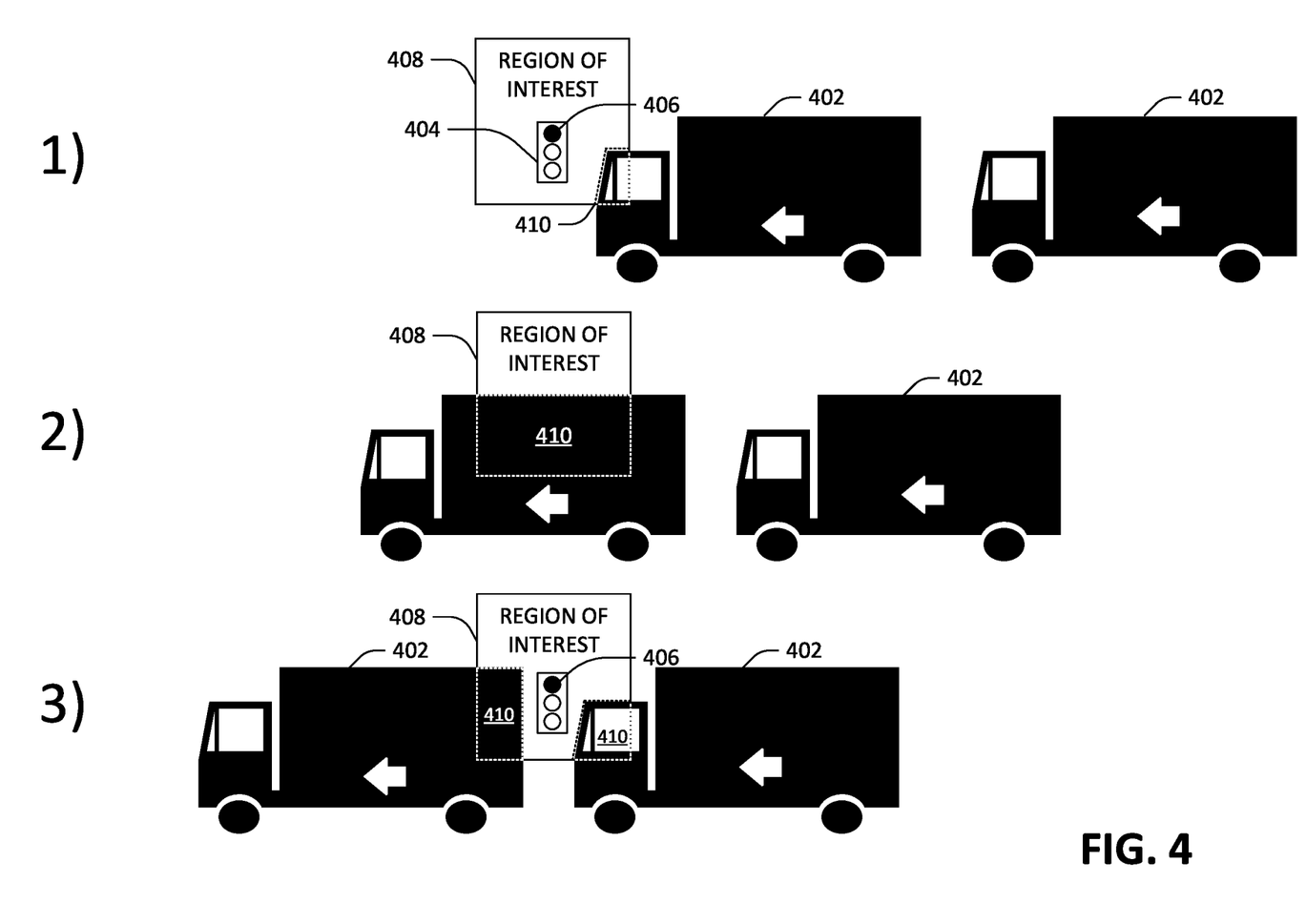
FIG. 4 illustrates a same field of view at three sequential timeframes.

With reference now to FIG. 4, a same field of view is illustrated at three sequential timeframes 1), 2), and 3). The field of view includes a series of trucks 402 passing through an intersection directed by a traffic light 404 having an illuminated solid red circle 406. A region of interest 408 frames the traffic light 404 and is provided to the object perception system 122 to determine a configuration thereof. The region of interest 408 corresponding to each timeframe 1), 2), and 3) includes an occlusion polygon 410 defined around a foreground object to the traffic light 404 based upon distance information incorporated in the range image.

At timeframe 1), the occlusion polygon 410 captures a cab portion of the truck 402. However, the traffic light 404 is not occluded within the region of interest 408. At timeframe 2), the truck 402 has advanced forward such that an enclosed trailer of the truck 402 is now fully occluding the traffic light 404. The occlusion polygon 410 is configured in the region of interest 408 of timeframe 2) to capture the enclosed trailer portion of the truck 402 where the traffic light 404 would otherwise be disposed. At timeframe 3), the truck 402 has advance even farther forward so that the traffic light 404 is once again exposed within the region of interest 408. The region of interest 408 of timeframe 3) includes a plurality of occlusion polygons 410 that capture a rear of the first truck and a front of the second truck. Illustrating a fourth and fifth timeframes from the same field of view would further perpetuate the pattern of occlusion followed by non-occlusion of the traffic light 404 due to the second truck 402.

Without the occlusion polygons 410 to differentiate between foreground objects and the traffic light 404, the object perception system 122 may, in two-dimensional object detection, determine that the bulb is a flashing red circle as opposed to a solid red circle 406 due to brief occlusion caused by the passing trucks 402. Accordingly, the occlusion reasoning module 306 is configured to detect an occlusion via the occlusion polygon 410 and exclude a range image sample in accordance therewith. Specifically, timeframe 2) may be exclude by the occlusion reasoning module 306 so that a configuration of the traffic light 404 is determined based upon only timeframes 1) and 3). This exclusion reduces the likelihood that a flashing red circle will be erroneously detected instead of the solid red circle 406.

Figure 5:
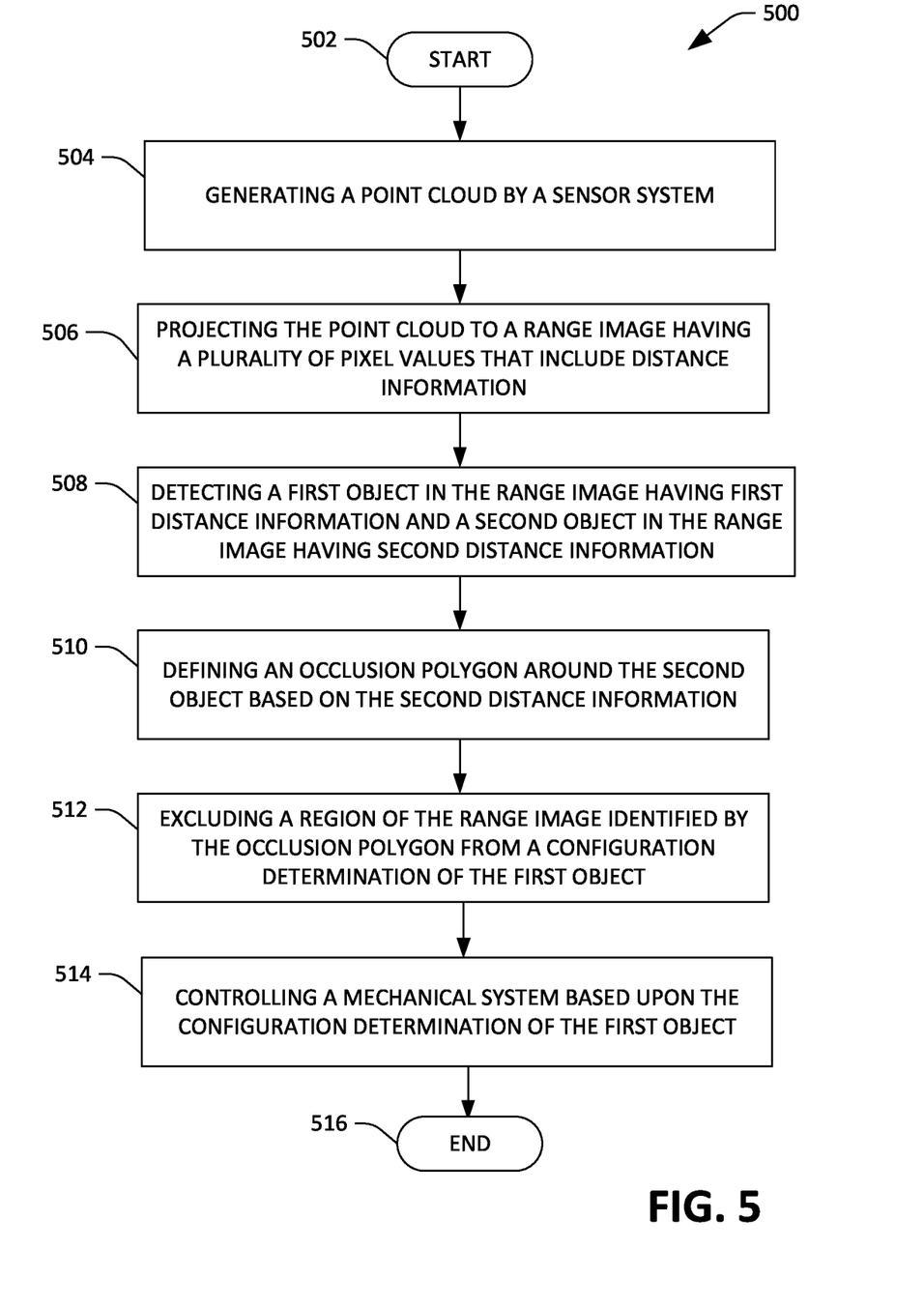
FIG. 5 is a flow diagram illustrating an exemplary methodology for traffic light occlusion detection for an autonomous vehicle.
Figure 6:
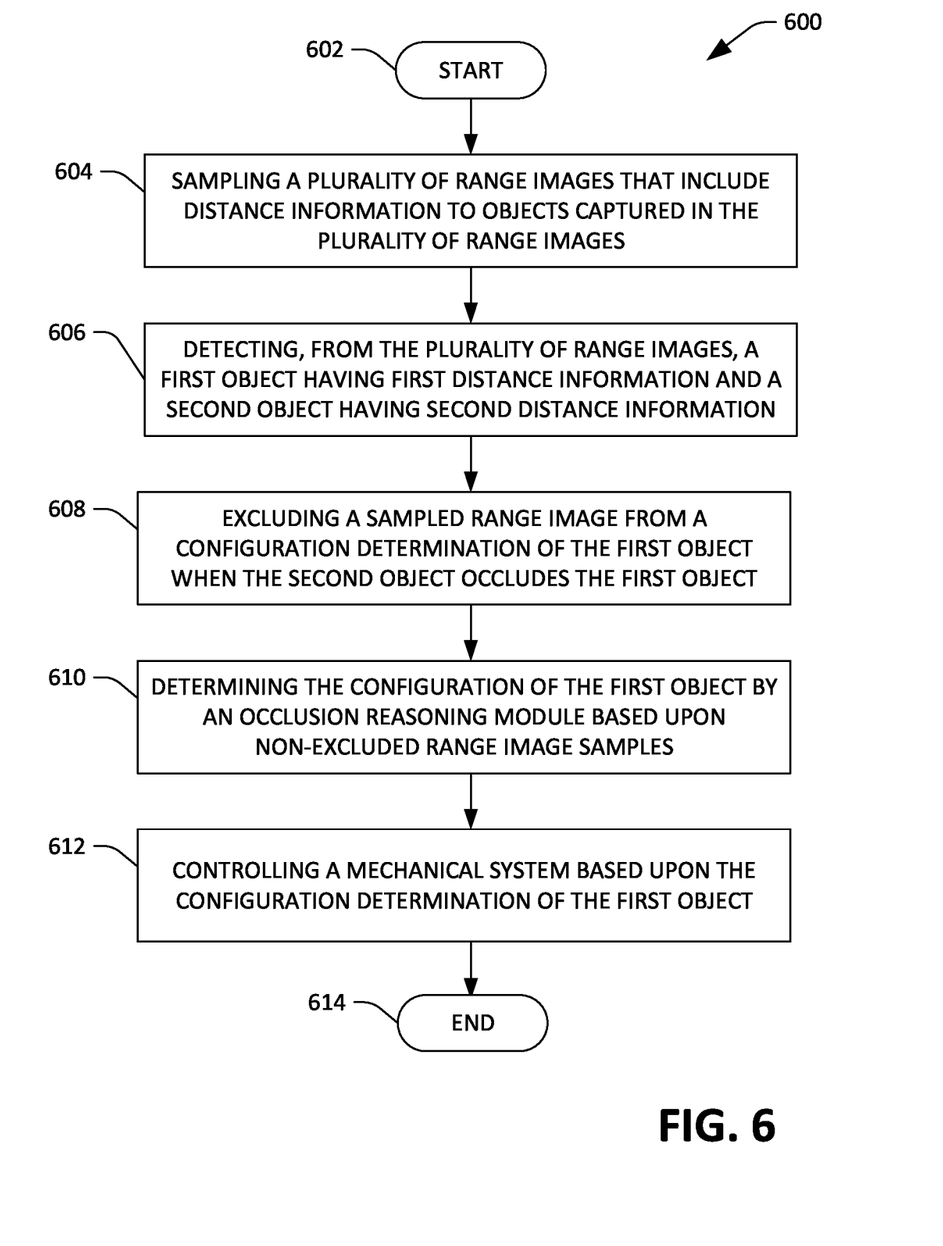
FIG. 6 is a flow diagram illustrating an exemplary methodology for traffic light occlusion detection for an autonomous vehicle.

FIGS. 5 and 6 illustrate exemplary methodologies relating to traffic light occlusion detection for an autonomous vehicle. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, an exemplary methodology 500 for traffic light occlusion detection for an autonomous vehicle is illustrated. The methodology 500 starts at 502, and at 504 a sensor signal is generated by a sensor system. The sensor signal may be a point cloud and the sensor system may be a lidar camera. At 506, the sensor signal is projected to a range image having a plurality of pixel values that include distance information, wherein the distance information of each pixel value defines a distance to an object captured in the range image. In an exemplary methodology, the sensor signal is received from the sensor system by a conversion system that projects the sensor signal to the range image. At 508, a first object is detected having first distance information and a second object is detected having second distance information. The first distance information typically defines a first distance that is longer than a second distance defined by the second distance information, although the methodology 500 is not limited to this configuration. At 510, an occlusion polygon is defined around the second object by the localization system based upon the second distance information. The occlusion polygon may further be included in a region of interest which is defined by the localization system to frame the first object. At 512, a portion of the range image identified by the occlusion polygon is excluded from a configuration determination of the first object. At 514, a mechanical system is controlled by a control system based upon the configuration determination of the first object. The methodology 500 completes at 516.

Referring now to FIG. 6, an exemplary methodology 600 for traffic light occlusion detection for an autonomous vehicle is illustrated. The methodology 600 starts at 602, and at 604 a plurality of range images is sampled by an occlusion reasoning module to detect an object. The plurality of range images has a plurality of pixel values that each include distance information to an object captured in the range image. At 606, a first object having first distance information and a second object having second distance information are detected from the plurality of range images. At 608, a sampled range image is excluded from a configuration determination of the first object by the occlusion reasoning module when the second object occludes the first object in the sampled range image. A sampled range image may also be excluded from a configuration determination of the first object when an emitted burst of light is detected in the sampled range image by the occlusion reasoning module. At 610, the configuration of the first object is determined by the occlusion reasoning module based upon non-excluded range image samples. At 612, a mechanical system is controlled by a control system based upon the configuration determination of the first object. The methodology 600 completes at 614.

Figure 7:
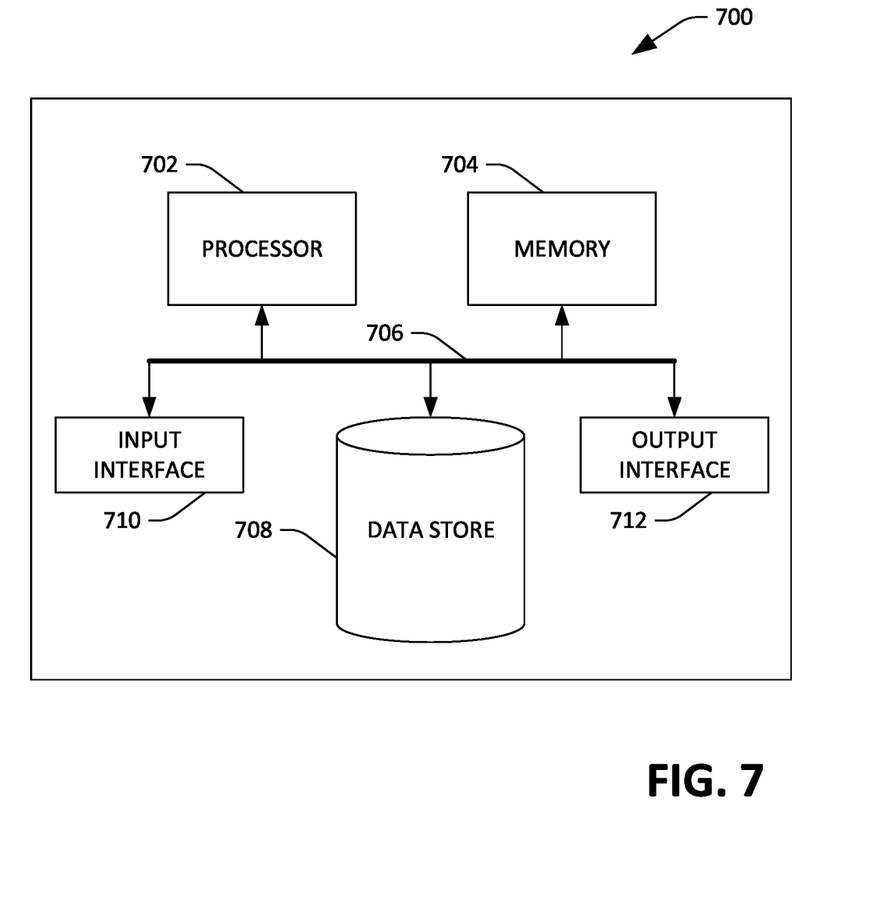
FIG. 7 illustrates an exemplary computing system.

Referring now to FIG. 7, a high-level illustration of an exemplary computing device 700 that can be used in accordance with the systems and methodologies disclosed herein is illustrated. For instance, the computing device 700 may be or include the computing system 112. The computing device 700 includes at least one processor 702 that executes instructions that are stored in a memory 704. The instructions may be, for instance, instructions for implementing functionality described as being carried out by one or more modules and systems discussed above or instructions for implementing one or more of the methods described above. In addition to storing executable instructions, the memory 704 may also store location information, distance information, direction information, etc.

The computing device 700 additionally includes a data store 708 that is accessible by the processor 702 by way of the system bus 706. The data store 708 may include executable instructions, location information, distance information, direction information, etc. The computing device 700 also includes an input interface 710 that allows external devices to communicate with the computing device 700. For instance, the input interface 710 may be used to receive instructions from an external computer device, etc. The computing device 700 also includes an output interface 712 that interfaces the computing device 700 with one or more external devices. For example, the computing device 700 may transmit control signals to the vehicle propulsion system 106, the braking system 108, and/or the steering system 110 by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle, comprising:
   a sensor system;
   a camera system; and
   a computing system in communication with the sensor system and the camera system, wherein the computing system comprising:
   a processor; and
   memory that stores computer-executable instructions that, when executed by the processor, cause the processor to perform acts comprising:
   converting three-dimensional point clouds outputted by the sensor system for respective time periods to two-dimensional range images, the two-dimensional range images comprise distance values to objects in an environment nearby the autonomous vehicles during the respective time periods;
   defining regions of interest in the two-dimensional range images that frame a traffic light;
   detecting regions in the two-dimensional range images having values closer than an expected distance to the traffic light;
   selecting a subset of the two-dimensional range images based on the regions of interest and the regions having the values closer than the expected distance to the traffic light such that a remainder of the two-dimensional range images having occluded regions of interest are excluded from the subset of the two-dimensional range images;
   identifying an illuminated configuration of the traffic light based on outputs from the camera system for the respective time periods corresponding to the subset of the two-dimensional range images; and
   controlling the autonomous vehicle based on the illuminated configuration of the traffic light.

2. The autonomous vehicle of claim 1, wherein differing outputs from the camera system for the respective time periods corresponding to the remainder of the two-dimensional range images having the occluded regions of interest are excluded from being used to identify the illuminated configuration of the traffic light.

3. The autonomous vehicle of claim 1, wherein the memory further stores computer-executable instructions that, when executed by the processor, cause the processor to perform acts comprising:
   for the two-dimensional range images in the subset of the two-dimensional range images, defining polygons around the regions having the values closer than the expected distance to the traffic light;
   wherein regions corresponding to the polygons in the outputs from the camera system for the respective time periods corresponding to the subset of the two-dimensional range images are excluded from being used to identify the illuminated configuration of the traffic light.

4. The autonomous vehicle of claim 3, wherein the polygon is a convex polygon.

5. The autonomous vehicle of claim 1, wherein the memory further stores computer-executable instructions that, when executed by the processor, cause the processor to perform acts comprising:
   for the two-dimensional range images in the subset of the two-dimensional range images, defining polygons around regions having values farther than the expected distance to the traffic light;

wherein regions corresponding to the polygons in the outputs from the camera system for the respective time periods corresponding to the subset of the two-dimensional range images are excluded from being used to identify the illuminated configuration of the traffic light.

6. The autonomous vehicle of claim 1, wherein the remainder of the two-dimensional range images excluded from the subset comprises a two-dimensional range image having a fully occluded region of interest.

7. The autonomous vehicle of claim 1, wherein the remainder of the two-dimensional range images excluded from the subset comprises a two-dimensional range image having a partially occluded region of interest.

8. The autonomous vehicle of claim 1, wherein the subset of the two-dimensional range images comprises a two-dimensional range image having a partially occluded region of interest.

9. The autonomous vehicle of claim 1, wherein the sensor system is a lidar sensor system that generates the three-dimensional point clouds.

10. A method performed by an autonomous vehicle, comprising:
converting three-dimensional point clouds outputted by a sensor system of the autonomous vehicle for respective time periods to two-dimensional range images, the two-dimensional range images comprise distance values to objects in an environment nearby the autonomous vehicles during the respective time periods;
defining regions of interest in the two-dimensional range images that frame a traffic light;
detecting regions in the two-dimensional range images having values closer than an expected distance to the traffic light;
selecting a subset of the two-dimensional range images based on the regions of interest and the regions having the values closer than the expected distance to the traffic light such that a remainder of the two-dimensional range images having occluded regions of interest are excluded from the subset of the two-dimensional range images;
identifying an illuminated configuration of the traffic light based on outputs from a camera system of the autonomous vehicle for the respective time periods corresponding to the subset of the two-dimensional range images; and
controlling the autonomous vehicle based on the illuminated configuration of the traffic light.

11. The method of claim 10, wherein differing outputs from the camera system for the respective time periods corresponding to the remainder of the two-dimensional range images having the occluded regions of interest are excluded from being used to identify the illuminated configuration of the traffic light.

12. The method of claim 10, further comprising:
for the two-dimensional range images in the subset of the two-dimensional range images, defining polygons around the regions having the values closer than the expected distance to the traffic light;
wherein regions corresponding to the polygons in the outputs from the camera system for the respective time periods corresponding to the subset of the two-dimensional range images are excluded from being used to identify the illuminated configuration of the traffic light.

13. The method of claim 12, wherein the polygon is a convex polygon.

14. The method of claim 10, further comprising:
for the two-dimensional range images in the subset of the two-dimensional range images, defining polygons around regions having values farther than the expected distance to the traffic light;
wherein regions corresponding to the polygons in the outputs from the camera system for the respective time periods corresponding to the subset of the two-dimensional range images are excluded from being used to identify the illuminated configuration of the traffic light.

15. The method of claim 10, wherein the remainder of the two-dimensional range images excluded from the subset comprises a two-dimensional range image having a fully occluded region of interest.

16. The method of claim 10, wherein the remainder of the two-dimensional range images excluded from the subset comprises a two-dimensional range image having a partially occluded region of interest.

17. The method of claim 10, wherein the subset of the two-dimensional range images comprises a two-dimensional range image having a partially occluded region of interest.

18. A computing system of an autonomous vehicle, comprising:
a processor; and
memory that stores computer-executable instructions that, when executed by the processor, cause the processor to perform acts comprising:
converting three-dimensional point clouds outputted by a sensor system of the autonomous vehicle for respective time periods to two-dimensional range images, the two-dimensional range images comprise distance values to objects in an environment nearby the autonomous vehicles during the respective time periods;
defining regions of interest in the two-dimensional range images that frame a focal object;
detecting regions in the two-dimensional range images having values closer than an expected distance to the focal object;
selecting a subset of the two-dimensional range images based on the regions of interest and the regions having the values closer than the expected distance to the focal object such that a remainder of the two-dimensional range images having occluded regions of interest are excluded from the subset of the two-dimensional range images;
identifying a state of the focal object based on outputs from a camera system of the autonomous vehicle for the respective time periods corresponding to the subset of the two-dimensional range images; and
controlling the autonomous vehicle based on the state of the focal object.

19. The computing system of claim 18, wherein the focal object is a traffic light, and the state of the focal object is an illumination configuration of the traffic light.

20. The computing system of claim 18, wherein the memory further stores computer-executable instructions that, when executed by the processor, cause the processor to perform acts comprising:
for the two-dimensional range images in the subset of the two-dimensional range images, defining polygons around the regions having the values closer than the expected distance to the focal object;

wherein regions corresponding to the polygons in the outputs from the camera system for the respective time periods corresponding to the subset of the two-dimensional range images are excluded from being used to identify the state of the focal object.

* * * * *